2,885,448

HALOCARBON POLYMERS

William T. Miller, Ithaca, N.Y.

No Drawing. Original application April 23, 1947, Serial No. 743,455, now Patent No. 2,700,661, dated January 25, 1955. Divided and this application November 24, 1954, Serial No. 471,110

8 Claims. (Cl. 260—653.1)

The present invention relates to the polymerization of perhalogenated olefins and more particularly to the polymerization of perfluoro-olefins and their partially chlorinated analogs.

The present application is in part a division of my prior and copending application Serial No. 743,455, filed April 23, 1947, now Patent No. 2,700,661.

An object of the invention is to prepare and to provide a process for the preparation of perhalocarbons ranging from low molecular weight volatile polymers such as dimers to high polymers in the plastic range of molecular weight.

Another object of the invention is to prepare and to provide a method for the preparation of perhalocarbons in a particularly useful range of oils, greases and lower molecular weight waxes.

Another object of the invention is to provide a polymerization process in which a higher proportion of the perhalogenated olefin monomer undergoes polymerization to compounds in the latter range than in the heretofore known polymerization processes.

A further object of the invention is to provide a process for the manufacture of perhalocarbon oils.

A still further object of the invention is to provide a process for the production of completely halogenated organic compounds having useful properties as oils combined with great chemical stability.

The above and other objects will become apparent in the course of the following description and will be pointed out more particularly in the claims.

Perhalocarbons, considered as chemical entities, may be defined as compounds consisting exclusively of carbon and halogen, with any degree of saturation. When it is sought to prepare them by the polymerization process of the present invention products may be obtained which are not absolutely pure; thus they may contain a proportion of polymer chains having groupings of elements other than halogen, derived from materials utilized in the synthesis other than the monomer which is polymerized. The polymerization products of this invention contain less than 2% of these elements based on the weight of sample. When very high stability is desired they may be replaced with stable halogen, processes for which are fully described below.

The saturated perfluorocarbons have exceptional stability, being non-inflammable and substantially chemically inert with a variety of boiling points and other desirable physical properties. They are thermally and chemically very stable and this stability extends to derivatives, such as the perfluorochlorocarbons. The fluorocarbon bond is non-oxidizable and reducible with great difficulty, and under conditions ordinarily encountered replacement reactions do not occur in these polyhalogen saturated compounds.

For a given molecular weight compound the vapor density is relatively high and the vapor may be used as an inert blanket, much heavier than carbon dioxide for instance. These saturated perfluorocarbons have high liquid and solid densities and corresponding advantages in float instruments and monometers and for separation of solids when inert material is required. The liquid range between melting point and boiling point is extended, and solvents, oils, etc. with unique properties of stability are available.

Perfluorocarbon oils and their partially chlorine-substituted analogs are valuable as lubricants, sealants, extractants, coolants, etc.

The saturated perfluorocarbon oils in general have relatively high viscosity indexes and the viscosity index may be varied especially for derivatives. The solvent properties of the saturated perfluorocarbons are poor with petroleum and for most organic compounds. However, the perfluorocarbons of relatively lower molecular weight are very soluble in ether, acetone and the fluorine-substituted short chain hydrocarbons but less soluble in low boiling point petroleum and sparingly soluble in alcohol. As the molecular weight of the perfluorocarbons increases they become still poorer solvents for the common organic compounds and may be used as immiscible extractants for petroleum.

The saturated liquid perfluorocarbons have high coefficients of expansion and are useful in instrumentation, being substitutable for mercury in many cases, particularly where the nonconducting properties of the perfluorocarbons are not objectionable.

In general the saturated perfluorocarbons are not adapted for use as intermediates because of their lack of specific reactivity. Under vigorous conditions they may be used in cracking procedures. As in the case of other high molecular weight materials, they usually involve a mixture of isomers, the isomers of the high molecular weight compounds being rather difficult to obtain pure.

Saturated perfluorochlorocarbons involving moderate amounts of chlorine have most of the stability properties of the saturated perfluorocarbons. The perfluorochlorocarbons are substantial solvents for the perfluorocarbons and this compatibility renders them useful in blending various proportions of both the hydrogen compounds and the fluorocarbons. Valuable modifications in physical properties may thus be secured.

It has been proposed to make perfluorocarbons by starting with hydrocarbons of the desired carbon skeletons and fluorinating them to replace the hydrogen with fluorine. Useful compounds and compositions have been prepared by these methods but the processes employed are relatively difficult to carry out, are expensive and in the case of higher molecular weight hydrocarbons it has been found extremely difficult to achieve total replacement of hydrogen. It has also been proposed to produce perfluorocarbons and perfluorochlorocarbons by the polymerization of completely halogenated olefinic compounds. A number of methods for achieving polymerization of such compounds are disclosed and claimed in my application Serial No. 601,387, filed June 25, 1945, now abandoned. By using as polymerizable monomers compounds which contain no hydrogen and conducting the process in such a way that the polymers contain little or no hydrogen and by subsequent treatment it is practicable to produce compounds and compositions with a wide variety of physical properties ranging from gases to solids which are characterized by extreme resistance to chemical attack.

The present invention is concerned with a method for carrying out a polymerization of perfluoro or perfluorochloro olefins to obtain a high yield of materials in the range of low molecular weight volatile compounds as dimers to high polymers in the plastic range of molecular weight. Of especial interest is the obtaining of a high yield of material in the range consisting of oils, greases and lower molecular weight waxes, the latter being defined as having the property of softening at temperatures below 125° C. and being appreciably soluble in certain solvents such as hot trichloroethylene. Extraction procedures may be used to separate the lower molecular weight waxes from the higher molecular weight waxes. The perfluoro or perfluorochloro olefins can be polymerized, apparently by a free radical type mechanism, under a variety of temperatures and pressures in the presence of polymerization promoters, such as organic peroxides and oxygen. The products of such polymerizations contain compounds with molecular weights ranging from the lowest dimers up to and including solid polymers. It has been found in accordance with this invention that the course of this type of polymerization can be controlled to a substantial extent to increase the proportion of compounds lying in the oil to wax range specified by conducting the polymerization in the presence of a chain transfer solvent. The effect of these chain transfer solvents is to reduce the proportion of very long chain compounds formed and to bring about a high conversion of monomer.

The chain transfer solvents of this invention are halogenated lower aliphatic compounds which are not substantially polymerizable under the conditions employed. Examples of suitable chain transfer solvents are chloroform, carbon tetrachloride, 1,1,2,2-tetrachloroethane, trichloroethylene, tetrachloroethylene, trichlorotrifluoroethane, and 1,2-dichloroperfluorocyclobutane. Completely fluorinated saturated compounds are not useful because of their inactivity as chain transfer agents. Experimental evidence indicates that the presence of some hydrogen, as in the case of chloroform, increases the activity of the solvents as chain transfer agents. Olefins which function as chain transfer agents may also enter into the polymers to varying extents depending upon their polymerization behavior. Thus, two perhalo-olefins, one of which is readily polymerizable and the other of which is not substantially polymerizable and which functions as a chain transfer agent may be reacted together without dilution, or in the presence of a saturated chain transfer solvent to produce useful variations in product composition.

The promoters useful for the polymerization are of the types which initiate free radicals and of these the organic peroxide type promoters are preferred. Useful organic peroxides include acyl peroxides such as acetyl peroxides, mono-, di-, and tri-chloroacetyl peroxides, fluoro-acetyl peroxides, benzoyl peroxide, p-bromobenzoyl peroxide, etc. Oxygen is also useful and apparently functions through the formation of organic peroxides by reaction with the olefin. The halogen-substituted organic peroxides are desirable from the viewpoint of stability in that polymer end groupings derived therefrom have little or no hydrogen, depending on the degree of halogen substitution.

The conditions for the polymerization are dictated by the nature of the monomer used, the temperature at which the promoter becomes active and the speed at which polymerization occurs. In the case of the two carbon atom monomers, the reaction is normally performed in a suitable pressure vessel since these materials are usually gases at reaction temperatures. In the case of benzoyl peroxide used as a promoter for the polymerization, temperatures of the order of 60–150° C. are useful. The times of reaction for the combination of perhalogenated fluorine-containing ethylenes and benzoyl peroxide to produce products in the desired oil to wax range are of the order of from a few minutes to several hours. The reaction is controlled as to temperature to produce the decomposition of the promoter at a reasonable non-violent rate and an advantage of the chain transfer mechanism of polymerization is the controllable nature of the reaction obtained while maintaining high conversion to low polymers. The reaction products are worked up by removing unreacted monomer and other undesirable materials, removing the chain transfer solvent and fractionating the polymer by distillation, solvent extraction or the like, to isolate the desired fraction. Where hydrogen containing solvents or promoters have been used in the polymerization, the polymer will contain some hydrogen generally in end groupings derived from the solvent or promoter. Some unsaturation will also ordinarily be present. Therefore, while this product has good chemical stability and is useful for many purposes, it is necessary to treat it further to obtain the highest degree of chemical inertness. Such further treatment may comprise fluorinating the selected fraction by means of elemental fluorine or a reactive compound such as cobalt trifluoride, silver difluoride, or other higher valence metal fluoride. Antimony pentafluoride may also be used to replace hydrogen with fluorine and to saturate the polymers, and is particularly useful when it is desired to replace chlorine with fluorine.

While the invention is not limited by considerations of the theory of the mechanism of the polymerization, several hypotheses are advanced which will assist in the understanding of the invention. It is conceived first of all that the polymerization reaction with which the invention is concerned proceeds by a free radical mechanism and that the function of the promoter is to initiate a chain of reactions of the free radical type. It is further conceived that the chain transfer solvents function to modify the free radical reactions to the extent of themselves reacting to form free radicals which in turn function as chain transfer agents in the main reaction. This effect multiplies the number of free radicals formed and is believed to be responsible at least in part for the increased yield observed in the practice of the process according to the invention. The radicals formed from the solvent apparently also react with the forming polymer and act as chain terminating agents thereby limiting the extent of polymerization and inhibiting the production of very long chain compounds.

The following equations are illustrative of the hypotheses just advanced in the case of the polymerization of trifluorochloroethylene in the presence of chloroform, as the chain transfer solvent, and with benzoyl peroxide as the promoter.

The general reaction may be expressed by the following equation:

(1) 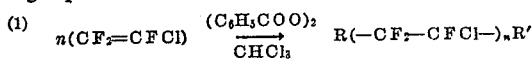

in which $n$ is a positive integer of at least 2 and where R and R′ may be groups or radicals at the end of the polymer chain derived either from the decomposition of the catalyst $(C_6H_5COO)_2$ or of the solvent $CHCl_3$, such as $C_6H_5$, $C_6H_5CO$, H, Cl, $CHCl_2$, $CCl_3$ and so forth, or from the monomer by disproportionation reactions.

The following equations offer one possible explanation of the mechanism by which the described reaction may take place.

(2) $(RCOO)_2 \rightarrow R^* + RCO^* + CO_2$
(3) $R^*(\text{or } RCO^*) + CFCl = CF_2 \rightarrow RCFCl - CF_2^*$
(4) $RCFCl - CF_2^* + CFCl = CF_2 \rightarrow$
$RCFCl - CF_2 - CFCl - CF_2^*$ The chain transfer mechanism may be illustrated by the equations:

(5) $R(CFCl - CF_2)_n CFCl - CF_2^* + CHCl \rightarrow$
$R(CFCl - CF_2)_n - CFCl - CF_2H - CCl_3^*$
(6) $CCl_3^* + CFCl = CF_2 \rightarrow CCl_3 - CFCl - CF_2^*$ The chain terminating mechanism may be illustrated by the equation:

(7) $R(CFCl - CF_2)_n CFCl - CF_2^* + CCl_3 \rightarrow$
$R(CFCl - CF_2)_n CFCl - CF_2 - CCl_3$.

In addition radical disproportionation reactions can occur such as:

(8) $2RCFCl-CF_2-CFCl-CF_2^* \rightarrow RCFCl-CF_2-CFCl-CF_2Cl + R-CFCl-CF_2-CF=CF_2$ Thus the end groupings may be from the class of hydrogen, halogen and organic radicals. An analogous series of reactions may be formulated when another monomer such as for example tetrafluoroethylene or hexafluorobutadiene is polymerized in the presence of the same or another polymerization promoter and solvent.

The following examples illustrate the practice of the invention in specific cases, but it is to be understotd that the process is susceptible of variation within the scope of the invention.

EXAMPLE 1

A 10% solution of trifluorochloroethylene in chloroform was mixed with 0.5% by weight of anhydrous benzoyl peroxide at −30° C. in a steel bomb. The mixture was allowed to warm to room temperature with shaking to insure complete solution and uniform mixing of the peroxide. The bomb was then heated in a thermostatically controlled oven at about 80° C. for about 14 hours. Unreacted trifluorochloroethylene and chloroform were recovered by distillation. Since the boiling point of trifluorochloroethylene is −26° C., it is necessary that this material be condensed under pressure or by the use of refrigeration. It is, however, unnecessary to separate the monomer from the chloroform completely since these materials are ordinarily recycled.

The product after the removal of the monomer and the solvent represented a conversion of monomer of somewhat more than 50%. The product was extracted with two portions of acetone using 350 cc. of acetone in each case per 100 gs. of product. The acetone insoluble material was removed by filtration. The weight ratio of acetone soluble to acetone insoluble product was 3.8 to 1.0. Acetone was recovered from the filtrate by distillation and the residue was distilled under vacuum of 0.5 mm. mercury. The fraction boiling between 100° and 270° C. at 0.5 mm. mercury represented 25% by weight of the monomer. This fraction was an oily liquid suitable for use as a lubricant or the like.

EXAMPLE 2

An extremely stable oil was prepared by polymerizing trifluorochloroethylene and working up the product as described in Example 1. The fraction boiling between 100° and 270° C. at 0.5 mm. mercury was placed in a nickel reactor equipped with a slow speed mechanical agitator and mixed with half its weight of cobalt trifluoride at room temperature. The temperature was slowly raised to 150° C. while continuing the agitation and was held at that temperature for one-half hour. Hydrogen fluoride was evolved as a reaction product during this time. The mixture was then cooled to 100° C. and a further quantity of cobalt trifluoride, equal to one-half the weight of the oil fraction, was added and mixed in. The temperature of the mixture was then slowly raised to 175° C. and held there for one-half hour, raised to 200° C. for one and one-half hours, and finally to 225° C. for two hours. A small quantity of chlorine was evolved at the higher temperatures and considerable unreduced cobalt trifluoride appeared to be present at the end of the reaction. The total time for the cobalt trifluoride treatment was six and one-half hours.

The reaction mixture was a stiff paste at room temperature. The oil was recovered by extraction with three one liter portions of boiling trichlorotrifluoroethane per pound of oil charged. The residual cobalt salts were suitable for reconversion to cobalt trifluoride by suitable fluorinating means. The trichlorotrifluoroethane was recovered by distillation and volatile matter was removed from the residue to a boiling point of 70° C. at 0.25 mm. mercury. The oil so obtained was clear white and free pouring at room temperature. The final product was obtained in a weight yield of 23% based on the weight of monomer polymerized.

EXAMPLE 3

26 grams of $CF_2=CFCl$ dissolved in 25 gs. $CHCl_3$ and heated at 85° C. with 1.25 gs. benzoyl peroxide for 100 hours yielded 25.2 gs. soft white solid after the solvent was largely removed. Approximately 30% of this solid product was soluble in acetone. Evaporation of the acetone left a Vaseline-like material. The acetone insoluble solid melted above 150° C. The acetone soluble material was partially distillable at 0.5 mm. of pressure and yielded an oil as a distillate.

In the foregoing examples portions of the polymerizate contained valuable materials with properties lying outside of the oil range. Among the higher compounds there are greases and waxes. The fractions below the oil range contain a variety of compounds extending from the unreacted monomer up to polymers of molecular weights just below the oil range.

To illustrate the effectiveness of various solvents in modifying the polymerization of trifluorochloroethylene in the presence of benzoyl peroxide, a series of seven runs was made. In each of these runs a molar ratio of solvent to olefin of 1.21 to 1 was maintained, while the molar ratio of benzoyl peroxide to olefine was 1 to 50. The mixtures were polymerized for about 24 hours at 75° C., the unreacted solvent and olefin distilled off, and the resultant product treated with acetone to separate it into two fractions as indicated in the table. The acetone soluble fraction consists essentially of the oils, greases and lower molecular weight waxes of the product.

*Table I*

| Example | Solvent | Percent Conversion | Percent Acetone Soluble | Percent Acetone Insoluble |
|---|---|---|---|---|
| 4 | Carbon tetrachloride | 44 | 25 | 75 |
| 5 | do | 41 | 23 | 77 |
| 6 | Chloroform | 47 | 50 | 50 |
| 7 | do | 46 | 50 | 50 |
| 8 | 1,2-dichloroperfluorocyclobutane | 20 | 44 | 56 |
| 9 | Trichlorotrifluoroethane ($CF_2ClCFCl_2$) | 15 | 25 | 75 |
| 10 | Perfluoro-n-heptane | 2 | | |

In view of the described type reaction mechanism, as might be expected, the effect of the solvent is more apparent as the proportion of solvent to olefin is increased. The effect of dilution is particularly apparent from the following table which summarizes a series of eight polymerization tests with trifluorochloroethylene in chloroform using benzoyl peroxide as a promoter. In these experiments the mole ratio of peroxide to olefin was held constant at 1:50 while the ratio of chloroform to olefin was varied from 7:1 to 1:3. Bombs containing the various mixtures were heated to 75° C. for about 24 hours and the product worked up as described for Examples 3 to 9.

*Table II*

| Example | Mole Ratio, Olefin/Solvent | Percent Conversion | Percent Acetone Soluble | Percent Acetone Insoluble |
|---|---|---|---|---|
| 11 | 0.143 | 42.4 | 77.5 | 22.5 |
| 12 | 0.143 | 40.4 | 78.9 | 21.1 |
| 13 | 0.344 | 66.4 | 54.7 | 45.3 |
| 14 | 0.345 | 66.7 | 63.5 | 36.5 |
| 15 | 1.028 | 50.8 | 47.2 | 52.8 |
| 16 | 1.034 | 51.5 | 46.5 | 53.7 |
| 17 | 3.09 | 29.6 | 48.3 | 51.7 |
| 18 | 3.12 | 29.8 | 45.3 | 54.7 |

These results indicate that there apparently is an optimum dilution for any given temperature and system at which the effectiveness of the solvent to modify is at a maximum, as evidenced by the percent conversion in column 3 of the above table. The effect of dilution on the properties of the resulting polymer is, as indicated in columns 4 and 5, toward increasing the proportion of relatively low molecular weight product formed.

EXAMPLE 19

Two solutions, each containing 300 gs. of $CF_2=CFCl$, 2700 gs. of $CHCl_3$ and 30.6 gs. of acetyl peroxide, were reacted for about ¾ of an hour at about 100° C. in steel bombs. Unreacted $CF_2=CFCl$ and $CHCl_3$ were removed by distillation from the combined contents of the bombs. The product was distilled into the following fractions:

| Boiling point range: | Weight, gs. |
|---|---|
| 60–120° C. at 0.4 mm. Hg | 123.4 |
| 120–240° C. at 0.4 mm. Hg | 243.8 |
| Residue | 166.0 |

EXAMPLE 20

A solution containing 277 gs. of $CF_2=CFCl$, 2490 gs. of $CHCl_3$ and 14 gs. of 95% chloroacetyl peroxide were reacted in a steel bomb at about 100° C. for about ½ hour. After removing most of the unreacted $CF_2=CFCl$ and $CHCl_3$ by distillation at atmospheric pressure the product was heated at 90° C. and 2 mm. Hg for about ¾ hour. 107.5 gs. amounting to a 38.7% yield of a soft greasy solid remained.

EXAMPLE 21

A solution containing 320 gs. of $CHCl_3$, 80 gs. of $CF_2=CFCl$ and 4 gs. of trichloroacetyl peroxide was reacted at about 0° C. for about 36 hours. The excess chloroform was removed from the reaction product by heating at atmospheric pressure followed by heating at 80 to 90° C. and 10 to 15 mm. Hg. The resulting product weighed 7.3 gs. 6.5 gs. of this product was extracted with two portions of acetone, respectively 50 ccs. and 25 ccs., and filtered. A fraction was insoluble and a fraction, 2.2 gs., was soluble. Acetone was removed from the soluble product by evaporation at 80 to 90° C. The acetone soluble product was a soft solid with a smear point of 40° C.

EXAMPLE 22

25 gs. of $C_4F_6$ (hexafluorobutadiene) and 1.25 gs. of benzoyl peroxide dissolved in 25 gs. of $CHCl_3$ were reacted in a bomb at about 85° C. for about 100 hours. After removing unreacted $C_4F_6$ and $CHCl_3$ by evaporation a very viscous tacky liquid product remained. The yield of product was 37.2%.

EXAMPLE 23

120 gs. of pure dry $CCl_4$, 280 gs. of pure dry $CHCl_3$ and 110 gs. of benzoyl peroxide were transferred to a steel bomb evacuated to 0.5 mm. Hg and maintained at the temperature of a mixture of carbon dioxide and trichloroethylene. Gaseous tetrafluoroethylene was passed through the solution in the bomb until 33 gs. had condensed. The bomb was then sealed and placed in a warm water bath which raised the temperature to 95° C. in 30 minutes. It was then maintained between 95° C. and 100° C. for about 110 minutes after which it was cooled rapidly.

The bomb was opened and about 5 gs. of volatile material permitted to escape. The remaining product was distilled at atmospheric pressure and then at 100° C. and 0.4 mm. Hg yielding 20.7 gs. of a solid polymer. A portion weighing 16.2 gs. of the solid was washed with three portions of 15 ccs. each of 80% ethanol. The ethanol wash liquid was distilled at 80° C. and 0.2 mm. to yield 1.0 g. of a relatively low molecular weight gummy polymer of tetrafluoroethylene. Higher molecular weight solids were also obtained, however, virtually the entire product was of lower molecular weight than commercially available polytetrafluoroethylene as shown by its relatively low softening point, i.e., none of the solid product melted above 300° C.

EXAMPLE 24

Approximately 5 ccs. each of $CF_2=CFCl$ and of $CF_2Cl$—$CFCl_2$, were sealed in a glass tube together with approximately 1.0 g. of $AlCl_3$. The tube was heated for 3 hours at 90° C., cooled, opened and the unreacted materials evaporated. Part of the remaining product distilled up to 50° C. leaving a light yellow solid which melted and evaporated when held in a flame on a spatula.

From the preceding description it will be understood that the invention provides a method for obtaining high conversion while at the same time limiting the degree of polymerization obtained by polymerizing a perhalogenated olefin of the class described in the presence of a given free radical forming promoter and under given reaction conditions. While many of the examples refer to the use of ethylene derivatives as starting monomers the invention is not so limited as shown by examples. The two carbon monomers are in general more readily polymerized and more readily obtainable than higher members of the series and are preferable for these reasons. However the effect of the chain transfer solvent on the course and extent of polymerization of perfluoro- and perfluorochloroolefins is a general effect. Diolefins such as perfluorobutadiene-1,3 may also be polymerized by this process and mixtures of olefins may be treated such as a mixture of perfluoroethylene and trifluorochloroethylene, or a mixture of trifluorochloroethylene and hexafluorobutadiene.

Since many embodiments might be made of the present invention and since many changes might be made in the embodiment described, it is to be understood that the foregoing description is to be interpreted as illustrative only and not in a limiting scope.

Having described my invention, I claim:

1. The method for preparing a polymer of hexafluorobutadiene which comprises polymerizing hexafluorobutadiene in a non-polymerizable aliphatic hydrocarbon selected from the group consisting of aliphatic hydrocarbons containing chlorine and aliphatic hydrocarbons containing chlorine and fluorine as a chain transfer solvent and in the presence of a polymerization promoter which initiates free radicals selected from the group consisting of the organic peroxides and oxygen.

2. The method of claim 1 in which said chain transfer solvent is chloroform.

3. The method of claim 1 in which said chain transfer solvent is carbon tetrachloride.

4. The method of claim 1 in which said chain transfer solvent is trifluorotrichloroethane.

5. The product of claim 1.

6. The method of claim 1 in which said organic peroxide is an acyl peroxide.

7. The method of claim 1 in which said organic peroxide is benzoyl peroxide.

8. The method for preparing a polymer of hexafluorobutadiene which comprises polymerizing hexafluorobutadiene in a non-polymerizable aliphatic hydrocarbon selected from the group consisting of aliphatic hydrocarbons containing chlorine and aliphatic hydrocarbons containing chlorine and fluorine as a chain transfer solvent and in the presence of an organic peroxide as the polymerization promoter at a temperature between about 60 and about 150° C.

References Cited in the file of this patent

UNITED STATES PATENTS

| 2,562,547 | Hanford et al. | July 31, 1951 |
| 2,636,908 | Dittman et al. | Apr. 28, 1953 |
| 2,668,182 | Miller | Feb. 2, 1954 |
| 2,700,661 | Miller | Jan. 25, 1955 |